United States Patent [19]

Mizobuchi et al.

[11] Patent Number: 4,699,525

[45] Date of Patent: Oct. 13, 1987

[54] THRUST BEARING

[75] Inventors: Shotaro Mizobuchi; Yoshikazu Kimura; Katusmi Sasaki, all of Kanagawa, Japan

[73] Assignees: Ebara Corporation, Tokyo; Ebara Research Co., Ltd., Fujisawa, both of Japan

[21] Appl. No.: 894,776

[22] Filed: Jul. 10, 1986

[30] Foreign Application Priority Data

Jul. 18, 1985 [JP] Japan ............................. 60-159329
Jul. 19, 1985 [JP] Japan ............................. 60-159647

[51] Int. Cl.⁴ ............................................. F16C 17/04
[52] U.S. Cl. .................................. 384/369; 384/112; 384/122; 384/123
[58] Field of Search ............... 384/369, 371, 123, 122, 384/121, 112

[56] References Cited

U.S. PATENT DOCUMENTS

| | | | |
|---|---|---|---|
| 3,376,083 | 4/1968 | Muijderman | 384/123 |
| 3,439,962 | 4/1969 | Gothberg et al. | |
| 3,726,572 | 4/1973 | Beardmore | |
| 3,918,773 | 11/1975 | Tuffias | |
| 4,007,974 | 2/1977 | Huber | 384/123 |
| 4,213,659 | 7/1980 | Tielemans et al. | |
| 4,558,909 | 12/1985 | Stauber | 384/123 |
| 4,575,264 | 3/1986 | Mizobuchi et al. | 384/369 |

FOREIGN PATENT DOCUMENTS

| | | |
|---|---|---|
| 16-12121 | 7/1941 | Japan . |
| 57-193418 | 8/1957 | Japan . |
| 60-26814 | 9/1985 | Japan . |
| 61-99717 | 5/1986 | Japan . |
| 61-99718 | 5/1986 | Japan . |
| 61-99721 | 5/1986 | Japan . |
| 61-167712 | 7/1986 | Japan . |
| 61-167713 | 7/1986 | Japan . |
| 61-167714 | 7/1986 | Japan . |

*Primary Examiner*—Lenard A. Footland
*Attorney, Agent, or Firm*—Wenderoth, Lind and Ponack

[57] ABSTRACT

A thrust bearing adapted to be rotated reversibly in the normal and opposite directions comprises two flat disc elements disposed in face-to-face contact, one of the elements being provided with spiral grooves on its opposite side surfaces, one of which is reverse to the other with respect to the spiral directions, both elements having a dent formed centrally on their opposing surfaces, respectively, to form a small space in combination in which a core member of sphere is installed with a small clearance between the surfaces of the small space and the core member.

12 Claims, 12 Drawing Figures

THRUST BEARING

FIELD OF INVENTION

The present invention relates to a thrust bearing and more particularly to a thrust bearing utilizing a fluid dynamic pressure derived from rotation of a member having spiral grooves on the surface thereof

BACKGROUND OF INVENTION

A type of thrust bearing has been known in which a bearing member having spiral grooves is employed to bear against a flat member such as to suspend a thrust load by the fluid dynamic pressure produced between the flat member and the surface having the spiral grooves when the two members are caused to rotate relative to each other. One of such examples is disclosed in U.S. Pat. No. 4,575,264. The thrust bearing disclosed in said U.S. patent is quite satisfactory in its operation and its excellency is admitted in the following points, namely, the dimension thereof being made compact; a special cooling means being unnecessary due to the presence of fluid surrounding the bearing; dynamic pressure serving to minimize the friction loss; power loss being greatly reduced say to 1/5 of the power required in the conventional tilting pad-type thrust bearing; and capable of bearing the thrust load in the direction of either type of rotation (normal and reverse). However, the thrust bearing disclosed in the above U.S. patent is usually limited for use in a vertical shaft and within water or liquid such as for a submersible motor and/or pump since the dynamic pressure is produced in the presence of water or liquid. Also, the thrust bearing of prior art has been supplied as a bearing already installed in a certain piece of equipment and, thus, such bearing has not been in a form that the bearing itself could be made independently available for use in various applications.

Also, the spiral element of prior art which has spiral grooves on its opposite side surfaces is arranged to be freely disposed between a stationary member and a rotatable member and, thus, it has been necessary to provide some means to prevent radial displacement of the spiral element. However, even with the provision of such means for preventing radial displacement, the thrust bearing of prior art has not been capable of being used in a horizontal shaft because the spiral element may interfere with the means for preventing radial displacement if such thrust bearing is to be installed in the horizontal shaft.

Further, another type of thrust bearing (so-called "hybrid type") is available which also utilizes fluid dynamic pressure derived from the relative rotation between an element having a spirally grooved surface and a flat element. An example of such an improved spiral groove thrust bearing of the hybrid type is disclosed in Japanese Patent Public Disclosure No. 74132/82. The hybrid type spiral groove thrust bearing disclosed in this Disclosure employs a steel ball embedded in a spiral groove element such that the steel ball protrudes a slight distance above the surface of the spiral element. This protruded portion of the ball serves as a pivot where the bearing is not being rotated. This type of bearing may serve to function as intended; however, the quite minor dimension of the protrusion needs to be precisely controlled so that such protruded distance is smaller than the clearance between the spiral element and the opposing surface when the fluid dynamic pressure is generated during the relative rotation therebetween. So manufacturing of this type of bearing is quite difficult. Further, this type of bearing may not be able to prevent radial displacement of the spiral element. Also, the ball would be subjected to repeated impact during stoppage and reversing of the rotational direction so that the protruded portion of the ball may be damaged whereby the function of the pivot is easily impaired. Because of the recognition that the thrust bearing proposed in the U.S. patent referred to above exhibited remarkable advantages compared to the thrust bearing of other types and also because of the difficulties encountered in the hybrid type disclosed in the above Disclosure, there has been a desire to have a thrust bearing enjoying substantially all of the advantages offered by the type disclosed in the above U.S. patent but free from the limitations or difficulties imposed thereon, such as application only to vertical shafts in the submerged state and the difficulties encountered in manufacturing, etc.

SUMMARY OF INVENTION

Accordingly, it is an object of the present invention to provide a thrust bearing comprising a spiral element for utilizing a fluid dynamic pressure and being free for use in a vertical shaft as well as in a horizontal shaft.

It is also a further object of the present invention to make the thrust bearing of the above type available for supply as a unit which may be applied to any kind of shaft, either vertical or horizontal, and regardless of whether or not the bearing is used within liquid.

The above objects are accomplished by the present invention.

In a preferred embodiment, it comprises a spiral element made in a disc form provided with flat and parallel surfaces on its opposite side surfaces, a spiral groove pattern being formed on each surface in such a manner that the direction of the spiral on one surface is reverse to that on the opposite surface;

a sliding surface element made in a disc form provided with flat and parallel surfaces on its opposite side surfaces, the sliding surface element being mated on its surface with the surface of the spiral element and both elements being given a dent centrally on their respective surfaces such as to form a small space in combination; and a core member or sphere disposed in the small space formed by the dents, the dimension of the core member being arranged to leave a small clearance between the core member and the opposing surfaces of the dent so that the opposing elements may make a plane contact therebetween and be restricted with respect to each other regarding the relative radial displacement.

The further objects and advantages of the present invention will be made clear when the detailed description of the preferred embodiments is reviewed referring to the accompanying drawings, a brief explanation of which is summarized below.

DESCRIPTION OF PREFERRED EMBODIMENTS

Figure 1:
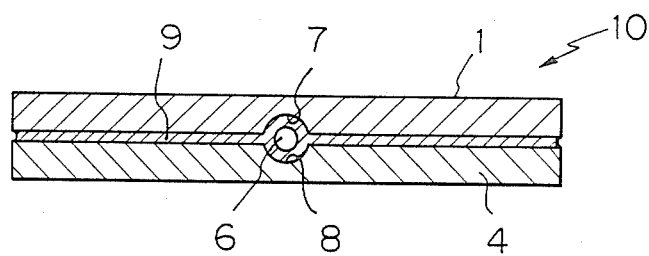
FIG. 1 is a thrust bearing according to the present invention shown in a cross-sectional view.

In FIG. 1, a thrust bearing 10 is illustrated as comprising a spiral element 1, a sliding surface element 4 and a small sphere or a core member 6. The spiral element 1 is configured in the form of a disc and in provided with a plurality of spiral grooves 2 (shown in FIG. 2) on opposite side surfaces. Also the elements 1 is provided with a dent 7 at the center of one of the side surfaces facing the sliding surface element 4 for the purpose of retaining the sphere 6 in the small space formed in cooperation with a similar dent 8 provided on the opposing surface of the slide surface element 4. The spiral grooves 2 are formed to have a depth in the range of from 3 $\mu$m to 50 $\mu$m so as to leave sliding surface portions 3, the width of which is arranged to be broader than the width of the groove 2. The surface planes of the sliding surface portions 3 and the sliding surfaces of the element 4 are finished by a super-finishing process so as to achieve a so-called mirror finish, say approx. 1 $\mu$m in flatness and approx. 0.3 $\mu$m in roughness. However, depending on the intended usage, the superfinishing may be omitted on one of the surfaces of the element 4.

The dimension of the sphere 6 is determined so as to leave only a minor clearance, or no clearance at all, between the surface of the sphere 6 and the dents 7 and 8 when the elements 1 and 4 are mated together with the sphere 6 interposed therebetween, as illustrated in FIG. 1. In a case a thin film 9 of lubricant is preferably applied where lubricant is employed between the elements 1 and 4 so as to cover the sphere 6 as well. If such film is not applied, air may take the place of lubricant.

Figure 2:
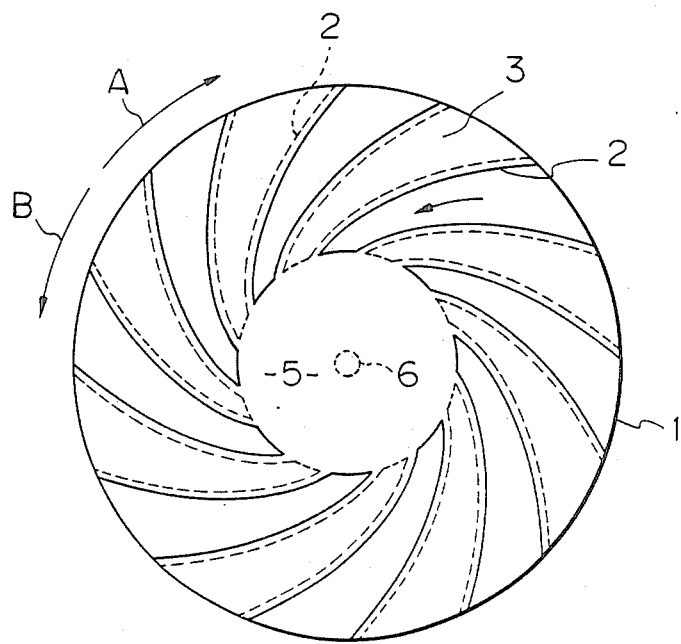
FIG. 2 is a plan view of a spiral element employed in the bearing shown in FIG. 1.

A plan view of the spiral element 1 is shown in FIG. 2. The pattern of the spiral grooves 2 shown in FIG. 3 corresponds to the pattern on the upper surface of the element 1 in FIG. 1. At the center, a recessed area 5 is provided which is coplanar with the grooves 2. What is essential in this element is that spiral pattern on the opposite surface is to be provided in a reverse fashion with respect to that shown in FIG. 2 so that, if the element 4 is assumed to be transparent, the spiral groove patterns on the opposite surfaces would be seen as similarly directed patterns when viewed from one side. The direction of the spiral grooves is determined so as to direct fluid or lubricant from the peripheral portion toward the central recessed area 5. In the case where the spiral element has the direction of the spirals shown in FIG. 2, the fluid will be directed from the peripheral portion to the central recess 5 when the spiral element is rotated in the direction "A" shown in FIG. 2 and thus against the stationarily held sliding surface element 4. The fluid or lubricant flowing in the direction of moving towards the central recessed area creates a fluid dynamic pressure between the two elements by means of which thrust load may be borne by the thrust bearing 10.

The spiral element 1 is preferably made of a material having a good thermal conductivity, withstanding high compressive force and being capable of being worked such as to be provided with an accurate surface condition. Suitable materials may, for example, be selected from ceramics such as silicon carbide (SiC), silicon nitride ($Si_3N_4$) etc., which may be porous or dense. The sliding surface element 4 is preferably made of hard material such as silicon carbide (SiC), alumina ceramics ($Al_2O_3$), super hard metal, cast iron, 13% Cr-stainless steel and bronze containing lead. The core member 6 is preferably made of hard material, for example, ceramics such as silicon carbide (SiC), silicon nitride ($Si_3N_4$) including $\beta$-type silicon carbide ($\beta$-SiC) or the steel which is used for roller bearings, etc. The core member may be porous or dense.

In the foregoing, dense or porous is referred to. In this connection, the porous condition may only be applied to the spiral element 1 and the core member 6 and the appropriate combination of materials is shown in Table 1 below.

TABLE 1

|  | Combination | | |
|---|---|---|---|
|  | A | B | C |
| spiral element | porous | dense | dense |
| sliding surface element | dense | dense | dense |
| core member | dense | porous | dense |

In a case where porous material is employed, lubricant may be impregnated therein.

Figure 3:
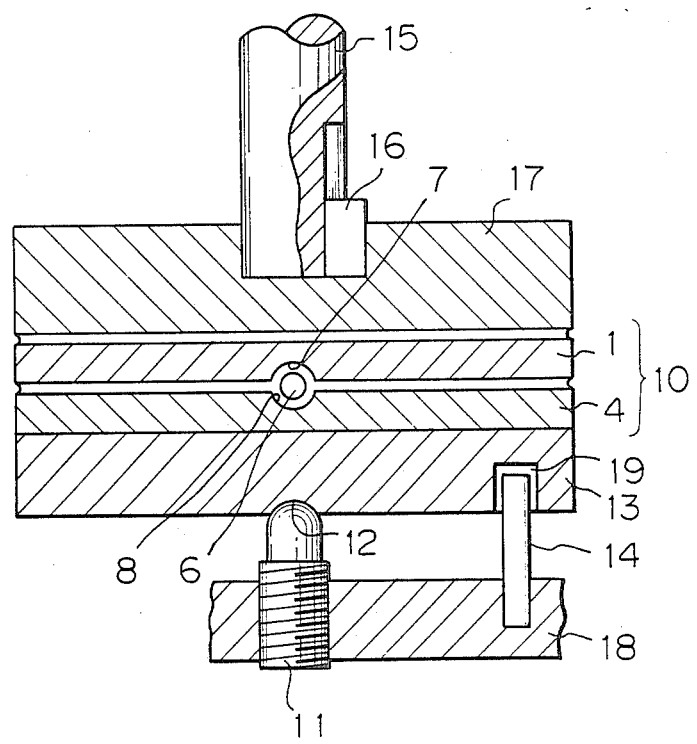
FIG. 3 shows an installation mode of the thrust bearing shown in FIG. 1.

The thrust bearing 10 shown in FIG. 1 is illustrated in FIG. 3 as an example of potential applications. In FIG. 3, the sliding surface element 4 is securely attached to a leveling block 13 by a suitable means such as a bonding agent which is supported at a central dent 12 on a lower surface thereof on a semi-spherical head of an adjustable stud 11 threaded into a stationary portion 18 and fixed at that portion. At the lower portion of the block 13 adjacent its periphery, a blind hole 19 is provided in which a pin 14 mounted on the stationary portion 18 is loosely received so as to prevent rotation of the sliding surface element 4. On the upper surface of the spiral element 1, a disc 17 having a flat surface on its underside is disposed such as to oppose the sliding surface element 4 and the disc 17 is coupled to a rotatable shaft 15 by means of a key 16. The material for the disc 17 is preferably selected in consideration of the same factors as those applied to the sliding surface element 4 and the surface thereof which opposes the spiral element 1 is to be finished to the same quality as that of the sliding surface element 4.

When the shaft 15 and the disc 17 is rotated in the counterclockwise direction "B", as viewed in FIG. 2, against the spiral element 1, fluid between the disc 17 and the element 1 is urged toward the central recessed area through spiral grooves 2 thereby producing fluid dynamic pressure which is higher at the center than the periphery, thereby to suspend the thrust load since the spiral element 1 is caused to adhere to the sliding surface element 4 due to the vacuum effect produced in this clearance by virtue of the flowing direction of the fluid between the spiral element 1 and the sliding surface element 4, which direction is directed radially outwardly from the central recessed area 5 through the grooves 2.

If the rotational direction of the shaft 15 is reversed, the spiral element 1 rotates together with the disc 17 and fluid dynamic pressure is produced between the spiral element 1 and the sliding surface element 4. The arrangement shown in FIG. 3 is explained with respect to the case where the thrust of the shaft 15 is directed downwardly. However, the thrust bearing 10 also withstands the thrust in the case where the thrust load of the shaft 15 in FIG. 3 is directed upwardly such that the shaft 15 is subjected to a force which urges it to be lifted. On such an occasion, the adhering effect caused by the vacuum is produced in either the clearance between the element 1 and the disc 17 or that between the element 1 and the element 4, depending on the rotational direction of the shaft 15.

Also, the arrangement shown in FIG. 3 exhibits the action of withstanding any tendency for the rotational direction to reverse during rotation. That is, if the rotational direction of the shaft 15 was suddenly changed, the spiral element 1 might experience an unstable condition with respect to the radial position thereof; however, the core member 6 will serve to stabilize the radial position of the spiral element 1.

Figure 4:
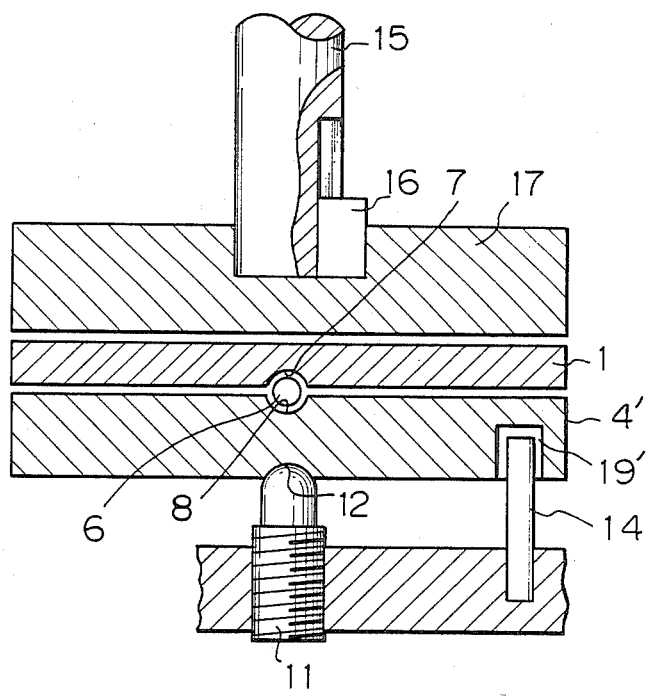
FIG. 4 is a modified mode of the installation shown in FIG. 3.

In the application shown in FIG. 3, the leveling block 13 is employed. However, if the sliding surface element 4 is made as an element 4' shown in FIG. 4 which is provided with a blind hole 19', the leveling block 13 may be eliminated.

Figure 5:
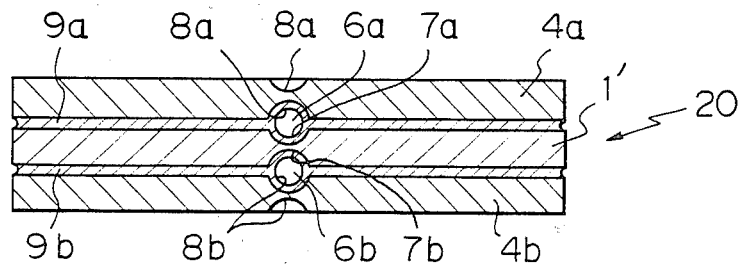
FIG. 5 shows another embodiment of the thrust bearing according to the present invention.

Another thrust bearing unit 20 is shown in FIG. 5 wherein a pair of sliding surface elements 4a and 4b are disposed on the opposite sides of a spiral element 1' with interposing spheres 6a and 6b, respectively within spaces formed by dents 8a and 7a and dents 7b and 8b, the dents 8a, 8b, 7a and 7b being located centrally in a manner similar to the dents 8 and 7 shown in FIG. 1. The bearing unit 20 may be installed in a manner similar to that shown in FIG. 3. Such installation is illustrated in FIG. 5 and, in this case, the upper sliding surface element 4a is securely attached to the disc 17 while the lower element 4b is securely attached to the leveling block 13. Due to the presence of two spheres or core members 6a and 6b, the sliding surface elements 4a and 4b are restricted in their radial movement at opposite sides of the spiral element 1', this arrangement is capable of withstanding some degree of radial load. The load capacity thereof may not be large but it is sufficient to prevent radial displacement of the elements.

Figure 6:
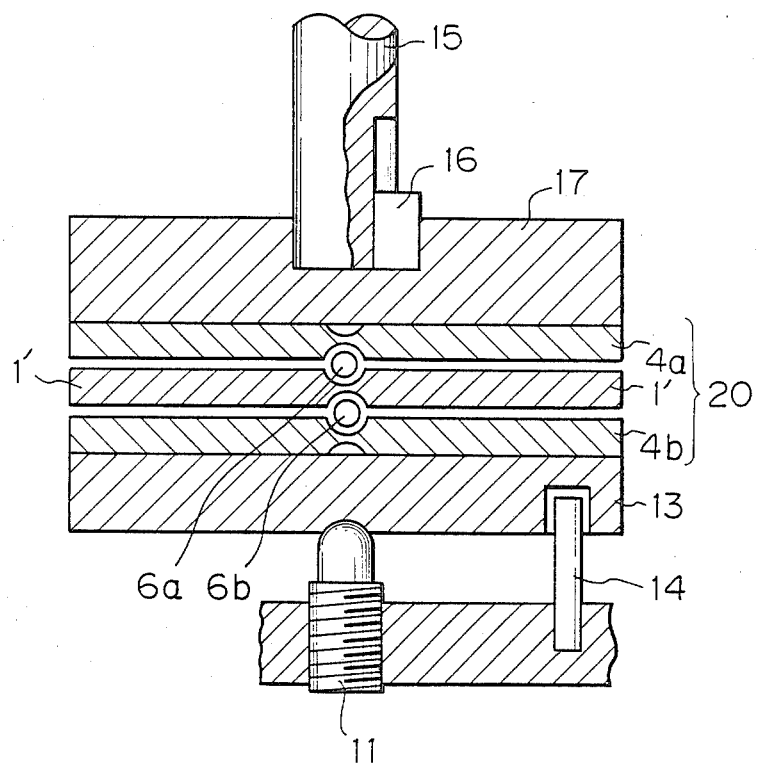
FIG. 6 shows an installation mode of the thrust bearing shown in FIG. 5.

It is noted that in the embodiment shown in FIGS. 5 and 6 the central dents 8a and 8b are provided on the opposite sides of the sliding surface elements 4a and 4b, respecively. These additional dents may serve to provide for interchangeability of the sliding surface elements. Of course, they may be provided solely on one of the surfaces. Further, the additional provision of dents 8a, 8b may serve to allow a plurality of sliding surface elements and spiral elements to be stacked alternately in the axial direction in a manner which will be explained below.

Figure 7:
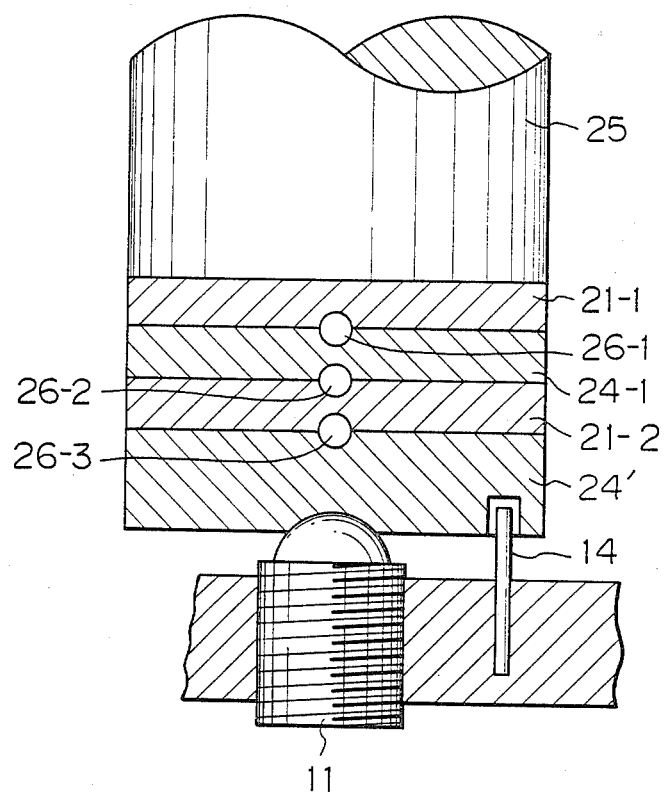
FIG. 7 shows an installation mode of a thrust bearing according to the present invention, the bearing comprising a plurality of spiral elements and sliding surface elements stacked alternately on each other in the axial direction.

Referring now to FIG. 7, there is shown an embodiment in which plural thrust bearing units are stacked in such a manner that the spiral element and sliding surface element are placed alternately with a core member interposed between each of the two elements. The lower end surface of a shaft 25 corresponds to the lower surface of the disc 17 shown in FIG. 4 and is finished in a similar manner to that of disc 17. Below the lower end of the shaft 25, a first spiral element 21-1 is positioned. A first sliding surface element 24-1 similar to the element 4a or 4b shown in FIG. 5 is disposed below the element 21-1 with a first sphere 26-1 interposed therebetween. Below the first sliding surface element 24-1, a second sphere 26-2, a second spiral element 21-2, a third sphere 26-3 and a second sliding surface element 24' are similarly disposed, the second sliding surface element 24' being held in a manner similar to that of the element 4' shown in FIG. 4. In this embodiment, the directions or orientations of the spiral grooves of the spiral elements 21-1 and 21-2 are all assumed to be the same as those shown in FIG. 2 when viewed from above.

As is clear from the construction explained above, if the shaft 25 is driven in the counterclockwise direction "B" as viewed in FIG. 2, there will be two interfaces wherein fluid dynamic pressure may possibly be produced, namely between the lower end shaft 25 and the first spiral element 21-1 and between the first sliding surface element 24-1 and the second spiral element 21-2.

However, when the shaft 25 is driven in the direction "B", one of the two interfaces able to produce the fluid dynamic pressure will firstly do so and the elements above and below such interface will make relative rotation, while the elements related to another interface will rotate or remain substantially stationary due to inertia, static friction and dynamic friction will be produced at that interface. Therefore, when the rotation of the shaft 25 is commenced in the counterclockwise direction "B" and fluid dynamic pressure is produced at the interface between the lower end of the shaft 25 and the first spiral element 21-1, the relative sliding action is only seen in this interface and the other elements 24-1, 21-2 and 24' will remain stationary. On the other hand, if the dynamic pressure is firstly generated in the interface between the element 24-1 and the element 21-2, the elements 21-1 and 24-1 will rotate together with the shaft 25 and the elements 21-2 and 24' will remain stationary. With the arrangement above, if, for example, in the case where the lower end surface of the shaft slides on the first spiral element 21-1, the lower end surface of the shaft and the first spiral element should stick to each other due to some scratches or the like therebetween, the other interface, namely that between the element 24-1 and the element 21-2 will be the place where fluid dynamic pressure is produced, whereby the shaft 25 will continue rotation together with the elements 21-1 and 24-1 on the spiral element 21-2. So, the construction explained referring to FIG. 6 provides a safety measure which serves to avoid stoppage of the rotation should there be any failure in one of the interfaces between the sliding surface element and the spiral element. If the rotational direction of the shaft is clockwise, the interface where the fluid dynamic pressure is generated will be either that between the elements 21-1 and 24-1 or that between the elements 21-2 and 24' and these interfaces will exhibit the same function as that explained in the case where the rotation is counterclockwise.

The arrangement shown in FIG. 7 may exhibit another operational mode as will now be explained. If the rotational speed of the shaft 25 is relatively high, the relative rotation between the rotating element and the stationary element may be mollified by providing some means on the spiral element for resisting rotation. If the rotation of one of the spiral elements is resisted, the relative rotation may not be enough at one of the interfaces to correspond to the rotation of the shaft 25 and relative rotation will then be created at the other interface whereby the relative rotational speed will be reduced at the respective interfaces.

Figure 7A:
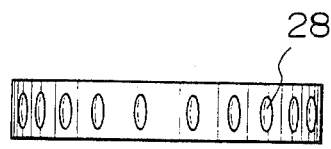
FIG. 7A is a modified side view of the elements employed in FIG. 7.

Such means may be represented by, for example, a series of dents 28 provided on the outer peripheral surface of the spiral element and the sliding surface element as shown in FIG. 7A. The surrounding fluid (air, liquid or lubricant) restricts the rotation of the element upon rotation of such elements having a series of peripheral dents. Of course, the number of the elements stacked in the axial direction may be increased. On FIG. 6, a sphere is shown as being provided between the lower end surface of the shaft 25 and the first spiral element 21-1. However, such portion may be provided at another place provided that it is limited to one place only among the stacked elements. Also, if the sphere is provided in all of the interfaces, the radial load may be borne or radial displacement of the elements may be prevented in a manner similar to that explained in connection with FIG. 6.

Figure 8A:
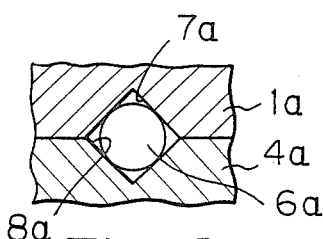
FIGS. 8A, 8B and 8C show a combination of dents formed on the surfaces of the opposing elements.
Figure 8B:
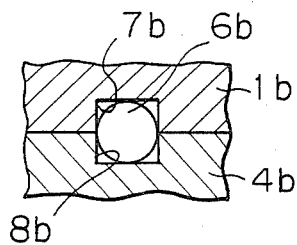
Figure 8C:
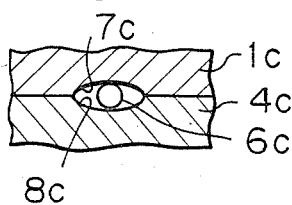

In the foregoing explanation, the core member has been explained as being a sphere and the dent receiving such core member has been illustrated as a semi-spherical dent; however, they may take another configuration and some alternative shapes thereof are illustrated in FIGS. 8A thru. 8C though the possible shapes are not limited to those illustrated therein. In these drawings, reference are given the same numerals as those in FIG. 1 with the suffixes "a", "b" and "c" added thereto. In FIG. 8A, a small sphere 6a is received in dents 7a and 8a, each of the dents 7a and 8a being formed in a conical shape. With this shape, the diameter of the sphere 6a is selected to adjust the clearance between the sphere 6a and the dents 7a and 8a which may also be applied to the other examples. In FIG. 8B, dents 7a and 7b are formed as cylindrical blind holes. The cylindrical wall surface of the dents may be ground to attain high accuracy. In FIG. 8C, a dent 7c and a dent 8c are in a elliptical form so as to receive a sphere 6c clearance between the dents 7c and 8c.

Several load tests were conducted on the thrust bearing according to the present invention.

I. Loading Test

An apparatus corresponding to that shown in FIG. 3 was subjected to testing under the following conditions.

The portion of the thrust bearing was immersed in water at room temperature.

The spiral element (1) and the sliding surface element (4) were both made from Alumina Ceramics.

With a thrust load of 3,500 Kgf and a revolutional speed of 3,000 r.p.m., the power loss was only 350 watts in both the counterclockwise and clockwise rotational directions.

It was observed that the spiral element did not undergo rotation relative to its opposing surface at the side where no dynamic fluid pressure was generated which depended on the rotational direction. This is because the friction coefficient of the surface having the spiral grooves is 0.003 when fluid dynamic pressure is produced while it is approx. 0.3 when there is no fluid dynamic pressure. Thus, the difference in torque value is more than 100 times between the opposing surfaces of the spiral element and this difference is the origin of the function or operational mode of the spiral element observed.

II. Comparative Test

This test was carried out to compare the friction loss of the thrust bearing according to the present invention with that of the conventional tilting pad-type thrust bearing.

The test was conducted with the bearings immersed within a liquid containing 75% propylene glycol.

Figure 9:
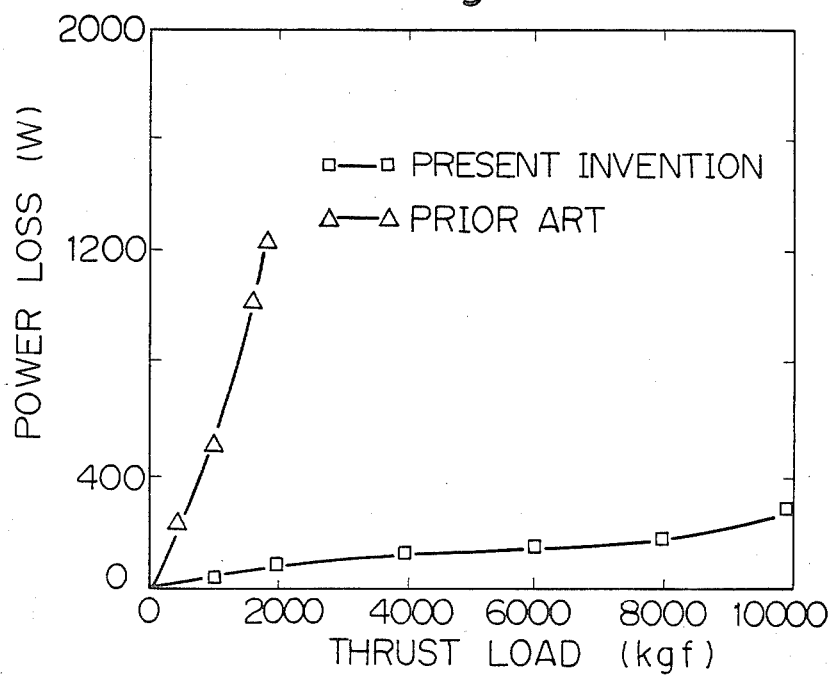
FIG. 9 shows comparative data regarding the power loss experienced in the prior art and in the present invention.

In the thrust bearing according to the present invention, the spiral element and the sliding surface element were both made of SiC and the disc (corresponding to the disc 17) was made of cast iron (FC 20). The tilting pad-type thrust bearing comprised a rotary element made of carbon and a stationary element made of 13% Cr stainless steel. The test results are shown in FIG. 9. The bearing of the prior art, i.e. the tilting pad-type thrust bearing, caused seizure at a thrust load of 1,800 Kgf and the power loss at this point was 1,200 watts. However, the thrust bearing according to the present invention did not show any signs of seizure at a higher load of 10,000 Kgf with a very low power loss of 280 watts being observed.

Also, when the thrust bearing according to the present invention was driven within slurry, no intrusion of slurry into the clearances between the elements was found.

The characteristics of the present invention have been explained in the foregoing. It should be noted herein that the spiral element according to the present invention is made mostly from ceramics such as has already been explained. Those materials are such that it is difficult to form spiral grooves therein with the conventional fabrication means. However, the grooves may be formed satisfactorily by a shot-blasting process through an appropriate mask such as may be applied on the surface by a photoresisting method. Fabrication of such grooves is disclosed, for example, in U.S. Ser. No. 627,731.

The thrust bearing according to the present invention may be used under several conditions such as in the presence of lubricant between the elements within liquid or in the dry state (air will act as the fluid in this case). In a case where lubricant is used, the application of lubricant in the space between the elements and on the surface of the sphere will be enough since fluid (lubricant) behave to cause fluid dynamic pressure but it may not flow to any substantial extent under the dynamic pressure which is produced in the coated layer of the lubricant.

Also, compared to the prior art thrust bearing which uses the spiral groove pattern for generating fluid dynamic pressure, the thrust bearing according to the present invention may bear radial loads or prevent relative radial displacement of elements. Further, it may be employed in a vertical shaft or a horizontal shaft in the intervening presence of the core members or spheres.

The present invention has been explained in detail by referring to specific embodiments; however, it should be noted that the present invention is not limited to those explained and it may be changed or modified by those skilled in the art within the sprit and scope of the present invention defined in the claims appended hereto.

What is claimed is:
1. A thrust bearing comprising:
   a spiral element made of hard material in a disc form having flat and parallel surfaces on its opposite sides, a spiral groove pattern being formed on each of said flat surfaces so that the spiral direction of the pattern on one side is reverse to that on the other side, a dent being centrally formed at least on one of said surfaces;

a sliding surface element made of hard material and formed as a disc having a flat surface with a central dent adapted to form a small space in combination with said dent of said spiral element when both flat surfaces having dents are mated; and a core member to be disposed within said small space formed by said dents, the core member being dimensioned to be loosely received within said small space so that the flat surfaces having said dents are intimately mated.

2. A thrust bearing as claimed in claim 1 wherein said hard material is ceramics.

3. A thrust bearing as claimed in claim 2 wherein said ceramics is silicon carbide or silicon nitride.

4. A thrust bearing as claimed in claim 1 wherein said core member is a sphere.

5. A thrust bearing as claimed in claim 4 wherein said dents are formed in a semi-spherical shape.

6. A thrust bearing as claimed in claim 4 wherein said dents are formed in a conical shape.

7. A thrust bearing as claimed in claim 4 wherein said dents are formed as a cylindrical blind hole.

8. A thrust bearing comprising:

a plurality of spiral elements, each of said spiral elements made of hard material in a disc form having a flat and parallel surface and a central dent on opposite sides thereof, a spiral groove pattern being formed in each of said flat surfaces so that the spiral direction of the pattern on one of the surfaces is reverse to that on the other surface;

a plurality of sliding surface elements each of which is made of hard material and provided with a flat and parallel surface and a central dent on opposite sides thereof, said sliding surface elements and said spiral elements being alternately stacked upon each other in the axial direction such that a small space is formed at each interface between the different elements by said dents on said different elements having their respective flat surfaces mated with each other; and a sphere so disposed within each of said small spaces that a clearance is left between the surface of said small space and the sphere while relative radial displacement between the opposing elements is prevented.

9. A thrust bearing as claimed in claim 8 wherein said sphere is eliminated at one of said small spaces.

10. A thrust bearing as claimed in claim 8 wherein the axially opposite end surfaces of said stacked elements are left flat without dents.

11. A thrust bearing as claimed in claim 8 wherein said hard material is ceramics.

12. A thrust bearing as claimed in claim 11 wherein said ceramics is silicon carbide or silicon nitride.

* * * * *